United States Patent
Studstill

(10) Patent No.: US 8,210,443 B2
(45) Date of Patent: Jul. 3, 2012

(54) FOLDABLE VEHICLE WHEEL TRACTION DEVICE

(76) Inventor: Herbert Studstill, Romulus, MI (US)

( * ) Notice: Subject to any disclaimer, the term of this patent is extended or adjusted under 35 U.S.C. 154(b) by 144 days.

(21) Appl. No.: 12/839,302

(22) Filed: Jul. 19, 2010

(65) Prior Publication Data

US 2012/0012663 A1    Jan. 19, 2012

(51) Int. Cl.
E01B 23/00  (2006.01)
(52) U.S. Cl. .................. 238/14; 238/10 R
(58) Field of Classification Search .......... 238/10 R, 238/10 C, 14; 180/7.1, 7.2, 7.3, 7.4, 7.5; 152/208, 209.1
See application file for complete search history.

(56) References Cited

U.S. PATENT DOCUMENTS

| | | | |
|---|---|---|---|
| 1,375,666 A | 4/1921 | Bauer | |
| 1,400,478 A | 12/1921 | Deschamps | |
| 1,683,411 A * | 9/1928 | Remmers | 238/14 |
| 2,479,760 A | 8/1949 | Merrick | |
| 3,357,639 A | 12/1967 | Peterson | |
| 3,640,459 A | 2/1972 | Preisler | |
| 3,701,474 A | 10/1972 | Welz | |
| 3,752,396 A | 8/1973 | Bustin | |
| 3,878,988 A | 4/1975 | Blais | |
| D255,791 S | 7/1980 | LaPointe | |
| 4,261,510 A | 4/1981 | Andrus | |
| 4,265,399 A | 5/1981 | Covington | |
| 4,300,722 A | 11/1981 | Simmons | |
| 4,568,020 A | 2/1986 | Gallichan | |
| 4,650,115 A * | 3/1987 | Fontaine | 238/14 |
| 5,439,171 A * | 8/1995 | Fruend | 238/14 |
| 5,538,183 A | 7/1996 | McGee | |
| 6,129,289 A | 10/2000 | Morin, Jr. | |
| 6,520,420 B1 | 2/2003 | Singh | |
| 6,575,660 B1 * | 6/2003 | Davis et al. | 404/35 |
| 6,779,738 B1 * | 8/2004 | Stannard | 238/14 |
| 6,874,972 B2 * | 4/2005 | Davis et al. | 404/35 |
| 6,881,006 B1 * | 4/2005 | Lange | 404/15 |
| 7,059,799 B1 * | 6/2006 | Lange | 404/15 |
| 7,350,719 B1 * | 4/2008 | Brenner | 238/14 |
| 7,404,524 B2 * | 7/2008 | Mathieu | 238/14 |
| 2011/0204152 A1 * | 8/2011 | Brown et al. | 238/14 |
| 2012/0012663 A1 * | 1/2012 | Studstill | 238/14 |

* cited by examiner

*Primary Examiner* — Mark Le
*Assistant Examiner* — Jason C Smith
(74) *Attorney, Agent, or Firm* — Patrick L. Mixon

(57) ABSTRACT

A foldable vehicle wheel traction apparatus is disclosed that includes four traction devices having a regular lattice structure. Each traction device is hingeably connected one to the other to permit the traction devices to be folded one on another with easy storage. The hingeable apparatus connected the traction devices permit minimal lateral movement, which allows the traction devices to be more easily maneuvered when being put in use. The ability of the traction apparatus to support the weight of the wheel is enhanced by the regular lattice structure of each traction device formed by the traction devices elongated lateral members and elongated cross members. In one embodiment, the cross members are composed of, or coated with materials that heat up when the vehicle wheel contacts and spins on the cross member, thereby promoting melting of snow or ice. In yet another embodiment, the shape of the cross-section of the cross members is chosen so that the cross member removes excess mud or snow adhering to the wheel.

5 Claims, 3 Drawing Sheets

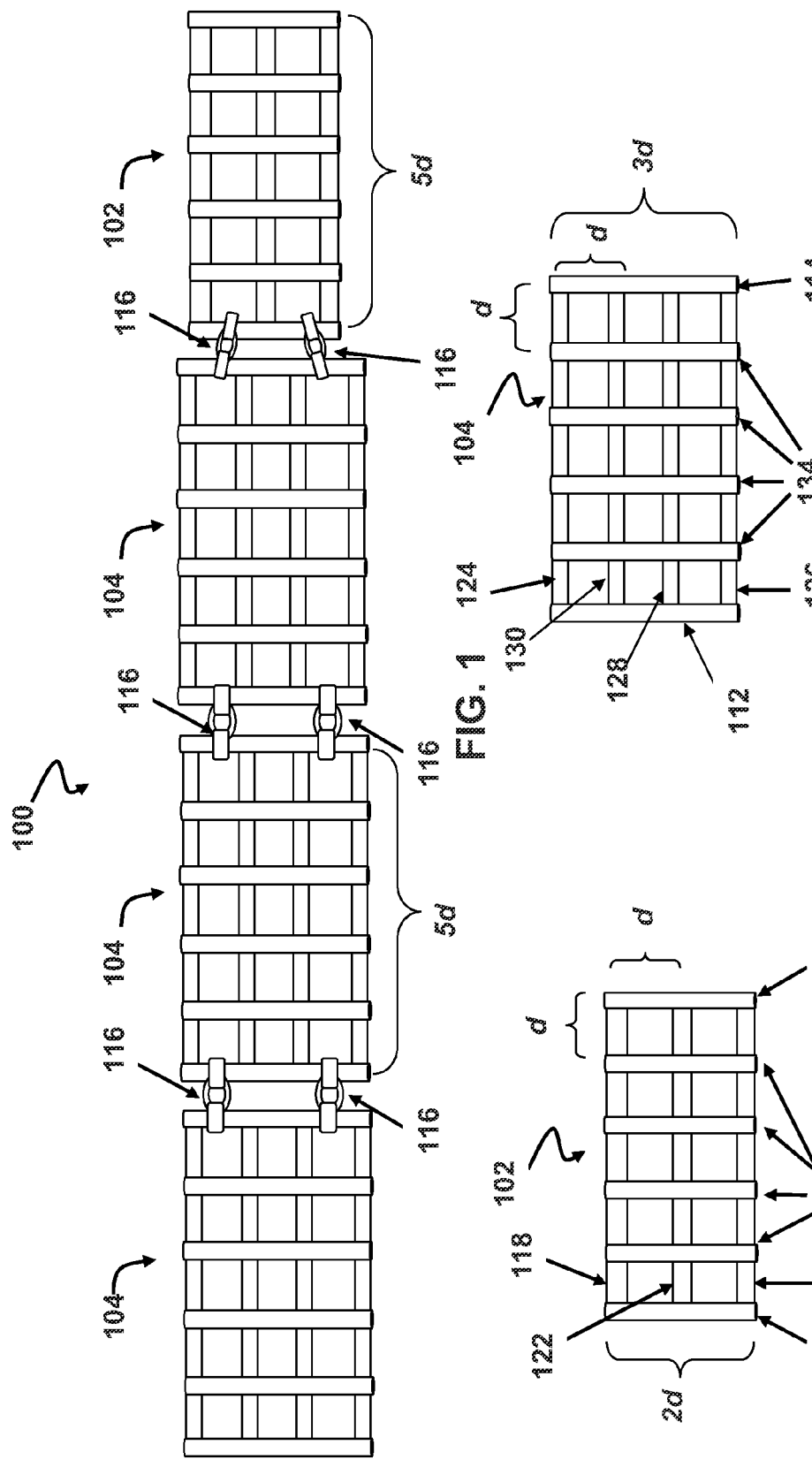

FOLDABLE VEHICLE WHEEL TRACTION DEVICE

FIELD OF INVENTION

This invention relates to foldable vehicle wheel device for a wheel bogged on relatively slippery surface. Particularly, the invention relates to a vehicle anti-slip device that is foldable for easy storage and geometrically constructed for maximum desired load bearing.

BACKGROUND

It is not uncommon for a wheeled vehicle to become immobilized in shifting or otherwise slippery surface. The prior art is includes examples of apparatus for providing mobility to the wheeled vehicle in these conditions. These prior art devices are typically either of a mat arrangement or a framed apparatus arrangement positioning between the drive train wheel of the vehicle and the shifting surface for fixing the vehicle relative to the surface.

U.S. Pat. Nos. 3,640,459; 3,749,309; 4,261,510 and 5,439,171 are typical examples of the mat arrangements found in prior art traction devices. Traction devices with a mat arrangement are predominately a flat or curved surface that is used to cover the shifting surface. In this way, the mat provides friction and traction between the wheel and the shifting surface.

Prior art traction mats are deficient in that the mat's predominately flat surface catches the build-up of loose material dislodged from the shifting surface and lodged in tracks of the wheel. Portions of the shifting surface on which the wheeled vehicle rested is deposited on the flat surface of the mat thereby creating a secondary shifting surface of the same composition. The wheel that was once immobilized on the shifting surface would then be immobilized on the secondary shifting surface formed between the wheel and the mat's flat surface.

Framed traction devices are typically composed of various frame shapes. For example, U.S. Pat. No. 6,129,289 features a traction device with a U-shaped frame. The U-shaped frame includes a plurality of traversing braces each having downwardly facing cleats to engage the shifting surface. U.S. Pat. No. 3,878,988 is another U-shaped frame traction device with traversing braces and downwardly facing cleats. The traversing braces of the device disclosed in the '988 patent are curved to fit into engagement with laterally traversing wheel tread cavities. U.S. Pat. No. 4,300,722 discloses another example of a framed traction device comprising a unitary elongated stamped metal structure that is generally rectangular but tapers forwardly and inwardly at one end. The upper surface of the device is flat and includes rectangular openings. The device upper surface includes upwardly extending gripping flanges while the lower surface includes V-shaped gripping lugs. U.S. Pat. No. 6,520,420 is another exemplary prior art frame traction device. The frame in this traction device is rectangular shaped and includes a plurality of traversing braces such that the openings created by the brace placement supplies rectangular openings.

The prior art framed traction devices are deficient in that their respective structures offer limited load bearing capacity, and proper useful traction surface, What is needed is a traction device whose construction is minimized for optimal load bearing and easy storage.

SUMMARY OF INVENTION

In accordance with one embodiment, a foldable vehicle wheel traction device is taught that comprises:

a. a first traction device having a lattice structure of width $2d$ and length $5d$, said first traction device having a first elongated cross member at a first end of said first traction device and a second elongated cross member at a second end of said first traction device, said first traction device further including four middle elongated cross members, wherein adjacent middle elongated cross members of the four middle elongated cross members are positioned a distance d from the next adjacent middle elongated cross members, and wherein the first of said four middle elongated cross member is a distance d from said first elongated cross member and said fourth of said four middle elongated cross members is a distance d from said second elongated cross member, said first traction device including a first elongated lateral member of length $5d$, a second elongated lateral member of length $5d$, and a middle elongated lateral member of length $5d$ intermediate to said first elongated lateral member and said second elongated lateral member, said first elongated lateral member connected to a first end of said first elongated cross member, said second elongated cross member, and said four middle elongated cross members, said second elongated lateral member connected to a second end of said first elongated cross member, said second elongated cross member, and said four middle elongated cross members, and wherein said middle elongated lateral member is connected to said first elongated cross member, said second elongated cross member, and said four middle elongated cross members, wherein said middle elongated lateral member is a distance d from said first elongated lateral member and said second elongated lateral member;

b. a second traction device hingeable coupled to said first traction device, wherein said hingeable coupling permits lateral movement of not more than about 1.5 inches, said hingeable coupling further permitting said first traction device to be folded onto said second traction device, and wherein said second traction device has a lattice structure of width $3d$ and length $5d$, said second traction device having a first elongated cross member at a first end of said first traction device and a second elongated cross member at a second end of said second traction device, said second traction device further including four middle elongated cross members, wherein adjacent middle elongated cross members of the four middle elongated cross members are positioned a distance d from the next adjacent middle elongated cross members, and wherein the first of said four middle elongated cross member is a distance d from said first elongated cross member and said fourth of said four middle elongated cross members is a distance d from said second elongated cross member, said second traction device including a first elongated lateral member of length $5d$, a second elongated lateral member of length $5d$, a first middle elongated lateral member of length $5d$ intermediate to said first elongated lateral member and said second elongated lateral member, and a second middle elongated lateral member of length $5d$ intermediate to said first middle elongated lateral member and said second elongate lateral member, said first elongated lateral member connected to a first end of said first elongated cross member, said second elongated cross member, and said four middle elongated cross members, said second elongated lateral member connected to a second end of said first elongated cross member, said second elongated cross member, and said four middle elongated cross members, and wherein said first middle elongated lateral member is connected to said first elongated cross member, said second elongated cross member, and said four middle elongated cross members, said second middle elongated lateral member is connected to said first elongated cross member, said second elongated cross member, and said four middle elongated cross members, wherein said first middle elongated lateral member is a distance d from said first elongated lateral member and said second middle elongated lateral member is a distance d from said first middle elongated lateral member and said second elongated lateral member;

c. a third traction device hingeable coupled to said second traction device, wherein said hingeable coupling permits lateral movement of not more than about 1.5 inches, said hingeable coupling further permitting said second traction device to be folded onto said third traction device, and wherein said third traction device has a lattice structure of width $3d$ and length $5d$, said third traction device having a first elongated cross member at a first end of said first traction device and a second elongated cross member at a second end of said third traction device, said third traction device further including four middle elongated cross members, wherein adjacent middle elongated cross members of the four middle elongated cross members are positioned a distance d from the next adjacent middle elongated cross members, and wherein the first of said four middle elongated cross member is a distance d from said first elongated cross member and said fourth of said four middle elongated cross members is a distance d from said second elongated cross member, said third traction device including a first elongated lateral member of length $5d$, a second elongated lateral member of length $5d$, a first middle elongated lateral member of length $5d$ intermediate to said first elongated lateral member and said second elongated lateral member, and a second middle elongated lateral member of length $5d$ intermediate to said first middle elongated lateral member and said second elongate lateral member, said first elongated lateral member connected to a first end of said first elongated cross member, said second elongated cross member, and said four middle elongated cross members, said second elongated lateral member connected to a second end of said first elongated cross member, said second elongated cross member, and said four middle elongated cross members, and wherein said first middle elongated lateral member is connected to said first elongated cross member, said second elongated cross member, and said four middle elongated cross members, said second middle elongated lateral member is connected to said first elongated cross member, said second elongated cross member, and said four middle elongated cross members, wherein said first middle elongated lateral member is a distance d from said first elongated lateral member and said second middle elongated lateral member is a distance d from said first middle elongated lateral member and said second elongated lateral member; and d. a fourth traction device hingeable coupled to said third traction device, wherein said hingeable coupling permits lateral movement of not more than about 1.5. inches, said hingeable coupling further permitting said fourth traction device to be folded onto said third traction device, and wherein said fourth traction device has a lattice structure of width $3d$ and length $5d$, said fourth traction device having a first elongated cross member at a first end of said first traction device and a second elongated cross member at a second end of said third traction device, said fourth traction device further including four middle elongated cross members, wherein adjacent middle elongated cross members of the four middle elongated cross members are positioned a distance d from the next adjacent middle, elongated cross members, and wherein the first of said four middle elongated cross member is a distance d from said first elongated cross member and said fourth of said four middle elongated cross members is a distance d from said second elongated cross member, said fourth traction device including a first elongated lateral member of length $5d$, a second elongated lateral member of length $5d$, a first middle elongated lateral member of length $5d$ intermediate to said first elongated lateral member and said second elongated lateral member, and a second middle elongated lateral member of length $5d$ intermediate to said first middle elongated lateral member and said second elongate lateral member, said first elongated lateral member connected to a first end of said first elongated cross member, said second elongated cross member, and said four middle elongated cross members, said second elongated lateral member connected to a second end of said first elongated cross member, said second elongated cross member, and said four middle elongated cross members, and wherein said first middle elongated lateral member is connected to said first elongated cross member, said second elongated cross member, and said four middle elongated cross members, said second middle elongated lateral member is connected to said first elongated cross member, said second elongated cross member, and said four middle elongated cross members, wherein said first middle elongated lateral member is a distance d from said first elongated lateral member and said second middle elongated lateral member is a distance d from said first middle elongated lateral member and said second elongated lateral member.

In accordance with one embodiment of the present invention, adjacent cross members simultaneously support the weight of the wheel as it traverses the foldable vehicle wheel traction device. Weight is supported by two at the same time generating more pulling power.

In another embodiment of the present invention, cross members remove material stuck to the exterior surface of the wheel when the wheel is in contact with, and spins on the cross member.

In yet another embodiment, the cross members of the device heat up during use. The cross members are comprised of or coated with a polymer that generates heat when the vehicle wheel contacts and spins on the surface of the cross member.

In still another embodiment of the invention, the material chosen is chosen so that the contact between the wheel and the cross members results in increased heat exchange for when the shifting material is ice. This promotes melting of the ice.

DRAWING FIGURES

These and other more detailed and specific features of the present invention are more fully disclosed in the following specification, reference being had to the accompanying drawings, in which:

FIG. 1 is an overhead view of an exemplary foldable vehicle wheel traction apparatus in accordance with the present invention.

FIG. 2 is an overhead view of a first traction device of an exemplary foldable vehicle wheel traction apparatus in accordance with the present invention.

FIG. 3 is an overhead view of an exemplary second, third, or fourth traction device of an exemplary foldable vehicle wheel traction apparatus in accordance with the present invention.

DETAILED DESCRIPTION OF THE INVENTION

Figure 4:
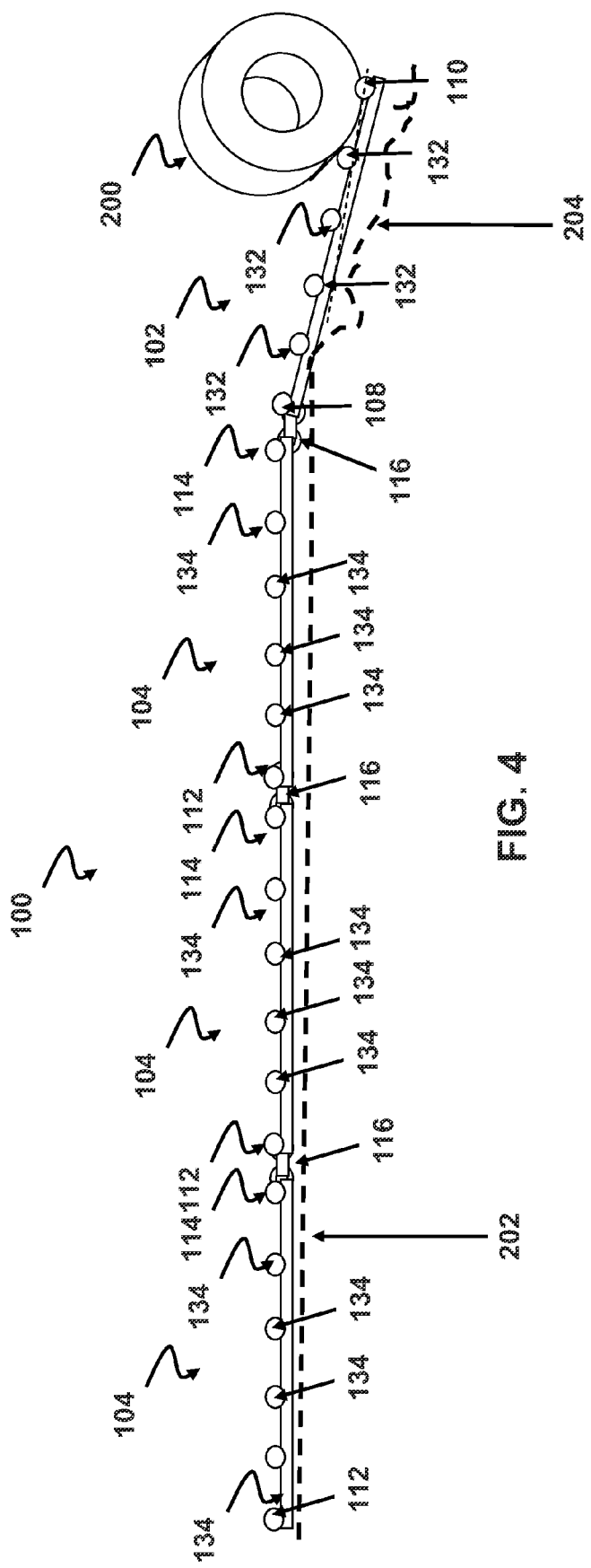
FIG. 4 depicts an exemplary traction apparatus of the present invention in operation.

The present may be described with reference to the figures or drawings depicted herein. However, it is to be understood that the drawings are exemplary ad only intended to aid the reader in understanding the inventive nature of the traction apparatus. Moreover, for brevity, notions and principles of friction, loose or slippery soil, wheel erosion, and soil consistency will not be discussed herein in detail.

FIG. 1 depicts an exemplary foldable vehicle wheel traction apparatus 100 in accordance with the present invention. As shown, traction apparatus 100 includes four traction device 102 and three traction devices 104 in linear adjacent arrangement. Traction device 102 is of a narrower in width than traction device 104. Each traction device is coupled to the next traction device using a hinging device 116 permitting a traction device to be folded onto an adjacent traction device (discussed with relation to FIGS. 5 and 6).

With respect to FIG. 2, a first traction device 102 is depicted. First traction device 102 comprises a first elongated lateral member 120 in parallel arrangement with a second elongated lateral member 118. First elongated lateral member 120 is positioned a distance 2d from second elongated lateral member 118. Intermediate first elongated lateral member 120 and second elongated lateral member 118 is a first middle elongated lateral member 122. First middle elongated lateral member 122 is positioned parallel to and equidistant from first elongated lateral member 120 and second elongated lateral member 118. For example, first middle elongated lateral member 122 is distance d from first elongated lateral member 120 and a distance d from second elongated lateral member 118. In accordance with one embodiment of the invention, first elongated lateral member 120, first middle elongated lateral member 122, and second elongated lateral member 118 are of the same length, width, shape and composition.

First traction device 102 further includes a first end elongated cross member 108 a first end of first traction device 102. First elongated cross member 108 has a length 2d. First elongated cross member 108 couples first elongated lateral member 120, first middle elongated lateral member 122, and second elongated lateral member in fixed arrangement.

First traction device 102 further includes a second elongated cross member 110. Second middle elongated cross member 110 is of a length 2d. Second elongated cross member 110 is position in parallel arrangement to first elongated cross member 108. Second elongated cross member 110 is positioned distance l from first elongated cross member 108. Second elongated cross member 110 couples first elongated lateral member 120, first middle elongated lateral member 122, and second elongated lateral member 118 in fixed arrangement. In one embodiment, first elongated cross member 108 is positioned a distance 5d from second elongated cross member 110.

First traction device 102 further comprises four middle elongated cross members 132 each of length 2d. Each of middle elongated cross members 132 is in parallel arrangement to first middle elongated cross member 108 and second elongated cross member 110. A first middle elongated cross member 132 is positioned a distance d from first elongated lateral member 108. A second middle elongated cross member 132 is positioned a distance d from first middle elongated cross member 132. The third middle elongated cross member 132 is positioned a distance d from the second middle elongated cross member 132. The fourth middle elongated cross member 132 is positioned a distance d from third middle elongated cross member 132. And, fourth middle elongated cross member 132 is positioned a distance d from the second elongated cross member 110. The middle elongated cross members 132 couple first elongated lateral member 120, first middle elongated lateral member 122, and second elongated lateral member 118 in fixed arrangement. In one exemplary embodiment, elongated lateral members and the elongated cross members are of the similar or identical cross-section.

Second, third and fourth traction devices 104 are of similar configuration each to one another. As such, a second traction device 104 is depicted in FIG. 3 by way of illustration. Second traction device 104 comprises a first elongated lateral member 126 in parallel arrangement with a second elongated lateral member 124. First elongated lateral member 126 is positioned a distance 3d from second elongated lateral member 124. Intermediate first elongated lateral member 126 and second elongated lateral member 124 is a first middle elongated lateral member 128 and a second middle elongated lateral member 130. First middle elongated lateral member 128 is positioned parallel to and equidistant from first elongated lateral member 126 and second middle elongated lateral member 130. Second middle elongated lateral member 130 is positioned parallel to and equidistant from first middle elongated lateral member 128 and second elongated lateral member 124. For example, first middle elongated lateral member 128 is distance d from first elongated lateral member 126 and a distance d from second middle elongated lateral member 130. Second middle elongated lateral member 130 is distance d from first middle elongated lateral member 128 and a distance d from second elongated lateral member 124. In accordance with one embodiment of the invention, first elongated lateral member 126, first middle elongated lateral member 128, second middle elongated lateral member 130 and second elongated lateral member 124 are of substantially similar or identical cross-section. In accordance with yet another embodiment of the invention, first elongated lateral member 126, second elongated lateral member 124, first middle elongated lateral member 128, and second middle elongated lateral member 130 are of substantially identical length or identical length. For example, second traction device 104 elongated lateral members each have a length of 5d.

Second, third, and fourth traction devices 104 further include a first elongated cross member 112, a second elongated cross member 114 and four middle elongated cross members 134, all of which are in parallel arrangement one to the other. In one embodiment, second traction device 104 cross members have identical cross section and a length 3d. The first middle elongated cross member 134 is a distance d from the second middle elongated cross member 134 and first elongated cross member 112; second middle elongated cross member 134 is a distance d from the third elongated cross member 134; the third elongated cross member is a distance d from the fourth middle elongated cross member 134; and fourth middle elongated cross member 134 is a distance d from second elongated cross member 114. Elongated cross members 112, 114 and middle elongated cross members 134 couple first elongated lateral member 126, first middle elongated lateral member 128, second middle elongated lateral member 130, and second elongated lateral member 124 in fixed arrangement.

Figure 6:
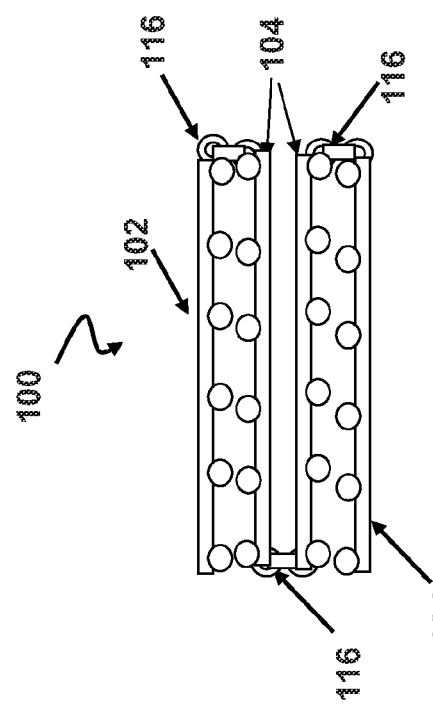
FIG. 6 depicts an exemplary traction apparatus of the present invention in substantially folded arrangement.
Figure 5:
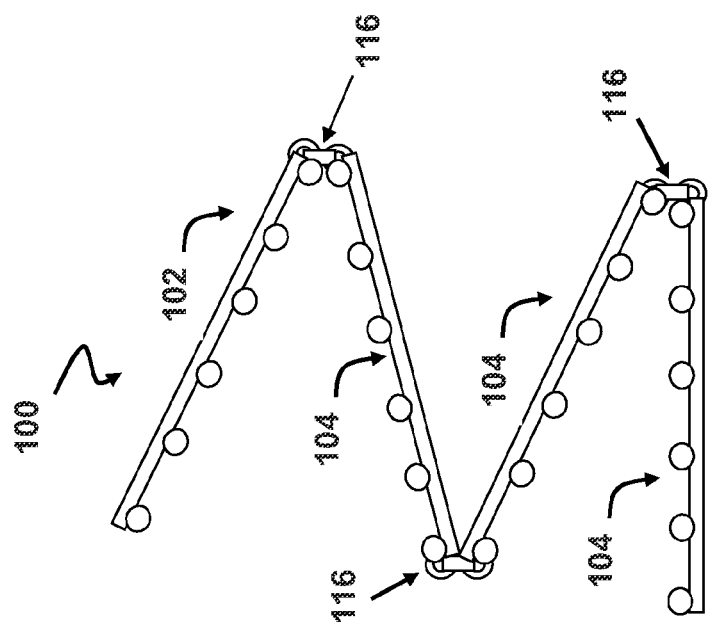
FIG. 5 depicts an exemplary traction apparatus of the present invention in partial folded arrangement.

As shown in FIGS. 1, 5 and 6, traction devices 102 and 104 are coupled in a movable hingeable arrangement so that traction devices 102 and 104 may be folded one on top of the other. Traction devices 102 is coupled to traction device 104 via flexible hinging apparatus 116, which allows some but minimal lateral movement. In one preferred embodiment, hinging apparatus 116 permits lateral movement of no more than 1.5 inches. For example, hinging apparatus 116 may be a chain link as shown in the drawing figures. The overall length of the hinging apparatus 116 is chosen so that the minimal 1.5 inch lateral movement is permitted. Additionally, the length of the hinging apparatus 116 is chosen so that the adjacent cross members of adjacent traction devices are permitted to simultaneously bear the weight of wheel 200. For example, where first traction device 102 is hingeably connected to second traction device 104 at second elongated cross member 114 and first elongated cross member 108 by hinging apparatus 116, then second elongated cross member 114 and first elongated cross member 108 are arranged at a distance one from the other allowing both the second elongated cross member 114 and the first elongated cross member 108 to simultaneously bear the load of wheel 200. By simultaneous what may be meant is that as wheel 200 traverses from first elongated cross member 108 to second elongated cross member 114 equally bear the load of wheel 200 as wheel 200 moves from first traction device 102 to second traction device 104. Similarly, when wheel 200 traverses from second traction device 104 to third traction device 104, hinging apparatus 116 between second traction device 104 and third traction device 104 is of appropriate length to allow wheel 200 to be simultaneously supported by the adjacent cross members of the second and third traction devices 104.

As seen in FIGS. 5 and 6, first traction device 102 folds at a hinging apparatus 116 relative to second traction device 104 such that second traction device 104 is positioned adjacent to second traction devices 104, third traction device 104 folds at a hinging apparatus 116 with respect to second traction device 104 such that third traction device 104 may rest adjacent to second traction device 104, and first traction device 102 folds at a hinging arrangement 116 with respect to second traction device 104, such that first traction device 102 may rest adjacent to second traction device 104.

Traction apparatus 100 may be constructed of a rigid material selected where the load bearing capacity of each traction device 102, 104 is calculated based on material composition, and which takes into account the lattice structure resulting from the arrangements of the elongated members and the cross members of each traction device. A suitable calculation considers that the lattice structure is composed of squares of side length d, and the length of each traction device 102 and 104 are of a length 5d.

FIG. 4 depicts foldable vehicle wheel traction device 100 in operation. FIG. 4 depicts an ordinary vehicle wheel 200 trapped in a slipper surface 204 of surface 202. To aid in understanding the invention, it is understood that wheel 200 is bogged in a surface which does not provide wheel 200 proper traction to propel a vehicle (not shown) attached to wheel 200.

Each elongated lateral member and elongated cross member may be substantially oval, circular or square in cross-section. In a preferred embodiment, the cross section of each cross member is chosen such that where there is superficial material, such as mud or snow, is attached to the exterior contacted by and removed by the cross member. For example, in use, first traction device 102 is placed in the slippery surface 204 adjacent to, and in contact with, wheel 200 such that wheel 200 may engage first traction device 102 at second elongated cross member 110. Once wheel 200 is made to rotate, wheel 200 rotates up onto second elongated cross member 110. If wheel 200 rotates or spins while in contact with second elongated cross member 110, second elongated cross member 110 removes excess superficial material exterior to wheel 200 until wheel 200 is made to contact with second elongated cross member 110. As wheel 200 rotates, material superficial to wheel 200 is removed by cross member 110 thereby providing traction of wheel 200 against traction device 102.

Once wheel 200 traverses upon second elongated cross member 110, the wheel 200 moves onto fourth middle elongated cross member 132, while still in contact with second elongated cross member 110. In this way, the weight of wheel 200 is supported by two adjacent cross members simultaneously. This supporting of the wheel weight is repeated as wheel 200 traverses from one cross member to an adjacent cross member. Additionally, as wheel 200 traverses from first traction device 102 to second traction device 104, the weight of the wheel 200 is supported by the cross member of first traction device 102 that is adjacent to traction device 104, and the cross member of second traction device 104 adjacent to first traction device 102. In a similar way, as wheel 200 traverses from second traction device 104 to third traction device 104, the weight of the wheel 200 is supported by the cross member of third traction device 102 that is adjacent to second traction device 104, and the cross member of second traction device 104 adjacent to third traction device 102. Further still, the weight supporting process described herein is equally useful for when wheel 200 traverses from any one of the traction devices to an adjacent traction device. In one exemplary embodiment, the distance d is chosen to be 3 inches to facilitate the weight support and weight distribution properties described herein. In this way, as wheel 200 traverses the traction apparatus 200, the wheel 200 is supported by at least two cross members simultaneously, thereby generating more pulling power than prior art traction apparatuses.

In still another embodiment of the invention, the material chosen is chosen so that the contact between the wheel and the cross members results in increased heat exchange between the cross members and the wheel. The material may be a polymer, or may be coated with a polymer that heats up rapidly when wheel 200 spins on the cross member while in contact therewith. This is especially useful for when wheel 200 is mired in snow or ice. The spinning action of wheel 200 in contact with the coated cross member causes the cross member to heat up, thereby promoting melting of the ice or snow. As the snow or ice melts, friction between the wheel 200 and the cross member increases, and the traction of the wheel 200 on the traction apparatus 100 increases.

Although the present invention has been described in considerable detail with reference to certain preferred embodiments thereof, other embodiments are possible. For example, although the invention is described with reference to a chain link hinging apparatus, other suitable hinging apparatus are suitable for use with this invention, so long as, such hinging apparatus permits the traction devices to be folded one over another for easy storage and also conforms to the minimal lateral movement as well. Therefore, the spirit and scope of the appended claims should not be limited to the description of the preferred embodiments contained herein, but includes equivalents thereof.

LEGEND

100—Overhead view of the foldable traction apparatus
102—First more narrow traction device
104—Second, Third, and Fourth traction device
108—First end elongated cross member of First traction device
110—Second end elongagted cross member of First traction device
112—First end elongated cross member for Second, Third, and Fourth traction device
114—Second end elongated cross member for Second, Third, and Fourth traction device
116—Linking device (i.e., chain, hinge, etc.)
118—First elongated lateral member of the First traction device
120—Second elongated lateral member of the First traction device
122—First middle elongated lateral member of the First traction device
124—First elongated lateral member of the Second, Third, and Fourth traction device
126—Second elongated lateral member of the Second, Third, and Fourth traction device
128—First middle elongated lateral member of the Second, Third, and Fourth traction device
130—Second middle elongated lateral member of the Second, Third, and Fourth traction device
132—Middle elongated cross member for First traction device.
134—Middle elongated cross member for Second, Third, and Fourth traction device.
200—Tire

The invention claimed is:

1. A foldable vehicle wheel traction device comprising:
   e. a first traction device having a lattice structure of width $2d$ and length $5d$, said first traction device having a first elongated cross member at a first end of said first traction device and a second elongated cross member at a second end of said first traction device, said first traction device further including four middle elongated cross members, wherein adjacent middle elongated cross members of the four middle elongated cross members are positioned a distance d from the next adjacent middle elongated cross members, and wherein the first of said four middle elongated cross member is a distance d from said first elongated cross member and said fourth of said four middle elongated cross members is a distance d from said second elongated cross member,
      said first traction device including a first elongated lateral member of length $5d$, a second elongated lateral member of length $5d$, and a middle elongated lateral member of length $5d$ intermediate to said first elongated lateral member and said second elongated lateral member, said first elongated lateral member connected to a first end of said first elongated cross member, said second elongated cross member, and said four middle elongated cross members, said second elongated lateral member connected to a second end of said first elongated cross member, said second elongated cross member, and said four middle elongated cross members, and wherein said middle elongated lateral member is connected to said first elongated cross member, said second elongated cross member, and said four middle elongated cross members, wherein said middle elongated lateral member is a distance d from said first elongated lateral member and said second elongated lateral member;
   f. a second traction device hingeable coupled to said first traction device, wherein said hingeable coupling permits lateral movement of not more than about 1.5 inches, said hingeable coupling further permitting said first traction device to be folded onto said second traction device, and wherein said second traction device has a lattice structure of width $3d$ and length $5d$, said second traction device having a first elongated cross member at a first end of said first traction device and a second elongated cross member at a second end of said second traction device, said second traction device further including four middle elongated cross members, wherein adjacent middle elongated cross members of the four middle elongated cross members are positioned a distance d from the next adjacent middle elongated cross members, and wherein the first of said four middle elongated cross member is a distance d from said first elongated cross member and said fourth of said four middle elongated cross members is a distance d from said second elongated cross member, said second traction device including a first elongated lateral member of length $5d$, a second elongated lateral member of length $5d$, a first middle elongated lateral member of length $5d$ intermediate to said first elongated lateral member and said second elongated lateral member, and a second middle elongated lateral member of length $5d$ intermediate to said first middle elongated lateral member and said second elongate lateral member, said first elongated lateral member connected to a first end of said first elongated cross member, said second elongated cross member, and said four middle elongated cross members, said second elongated lateral member connected to a second end of said first elongated cross member, said second elongated cross member, and said four middle elongated cross members, and wherein said first middle elongated lateral member is connected to said first elongated cross member, said second elongated cross member, and said four middle elongated cross members, said second middle elongated lateral member is connected to said first elongated cross member, said second elongated cross member, and said four middle elongated cross members, wherein said first middle elongated lateral member is a distance d from said first elongated lateral member and said second middle elongated lateral member is a distance d from said first middle elongated lateral member and said second elongated lateral member;
   g. a third traction device hingeable coupled to said second traction device, wherein said hingeable coupling permits lateral movement of not more than about 1.5 inches, said hingeable coupling further permitting said second traction device to be folded onto said third traction device, and wherein said third traction device has a lattice structure of width $3d$ and length $5d$, said third traction device having a first elongated cross member at a first end of said first traction device and a second elongated cross member at a second end of said third traction device, said third traction device further including four middle elongated cross members, wherein adjacent middle elongated cross members of the four middle elongated cross members are positioned a distance d from the next adjacent middle elongated cross members, and wherein the first of said four middle elongated cross member is a distance d from said first elongated cross member and said fourth of said four middle elongated cross members is a distance d from said second elongated cross member, said third traction device including a first elongated lateral member of length 5*d*, a second elongated lateral member of length 5*d*, a first middle elongated lateral member of length 5*d* intermediate to said first elongated lateral member and said second elongated lateral member, and a second middle elongated lateral member of length 5*d* intermediate to said first middle elongated lateral member and said second elongate lateral member, said first elongated lateral member connected to a first end of said first elongated cross member, said second elongated cross member, and said four middle elongated cross members, said second elongated lateral member connected to a second end of said first elongated cross member, said second elongated cross member, and said four middle elongated cross members, and wherein said first middle elongated lateral member is connected to said first elongated cross member, said second elongated cross member, and said four middle elongated cross members, said second middle elongated lateral member is connected to said first elongated cross member, said second elongated cross member, and said four middle elongated cross members, wherein said first middle elongated lateral member is a distance d from said first elongated lateral member and said second middle elongated lateral member is a distance d from said first middle elongated lateral member and said second elongated lateral member; and h. a fourth traction device hingeable coupled to said third traction device, wherein said hingeable coupling permits lateral movement of not more than about 1.5 inches, said hingeable coupling further permitting said fourth traction device to be folded onto said third traction device, and wherein said fourth traction device has a lattice structure of width 3*d* and length 5*d*, said fourth traction device having a first elongated cross member at a first end of said first traction device and a second elongated cross member at a second end of said third traction device, said fourth traction device further including four middle elongated cross members, wherein adjacent middle elongated cross members of the four middle elongated cross members are positioned a distance d from the next adjacent middle elongated cross members, and wherein the first of said four middle elongated cross member is a distance d from said first said fourth traction device including a first elongated lateral member of length 5*d*, a second elongated lateral member of length 5*d*, a first middle elongated lateral member of length 5*d* intermediate to said first elongated lateral member and said second elongated lateral member, and a second middle elongated lateral member of length 5*d* intermediate to said first middle elongated lateral member and said second elongate lateral member, said first elongated lateral member connected to a first end of said first elongated cross member, said second elongated cross member, and said four middle elongated cross members, said second elongated lateral member connected to a second end of said first elongated cross member, said second elongated cross member, and said four middle elongated cross members, and wherein said first middle elongated lateral member is connected to said first elongated cross member, said second elongated cross member, and said four middle elongated cross members, said second middle elongated lateral member is connected to said first elongated cross member, said second elongated cross member, and said four middle elongated cross members, wherein said first middle elongated lateral member is a distance d from said first elongated lateral member and said second middle elongated lateral member is a distance d from said first middle elongated lateral member and said second elongated lateral member.

2. A foldable vehicle wheel traction device of claim 1 wherein adjacent elongated cross members simultaneously support a vehicle wheel during use.

3. A foldable vehicle wheel traction device of claim 1 where said distance d is 3 inches.

4. A foldable vehicle wheel traction device of claim 1 wherein said cross members are coated with a heat inducing coating.

5. A foldable vehicle wheel traction device comprising:
a first traction member apparatus comprising,
a. a first elongated lateral member having a first end and a second end, said first elongated lateral member having said length l,
b. a second elongated lateral member having first end and a second end, said second elongated lateral member having said length l, said first elongated lateral member positioned parallel to said second elongated lateral member, said first end of said first elongated lateral member positioned adjacent said first end of said second elongated lateral member, said second end of said first elongated lateral member positioned adjacent said second end of said second elongated member,
c. a first middle elongated lateral member having a first end and a second end, said middle elongated lateral member having a length l, said middle elongated lateral member positioned parallel to said second elongated member and said first elongated member, said first end of said middle elongated lateral member opposite said first end of said second elongated lateral member and said first end of said first lateral member, said second end of said middle elongated lateral member positioned opposite said second end of said first elongated lateral member and said second end of said second elongated lateral member, said middle elongated lateral member positioned a distance d from said first elongated lateral member, said middle elongated lateral member positioned said distance d from said second elongated lateral member,
d. a first elongated cross member having a first end and a second end, said first elongated cross member having a length w, said first end of said first elongated cross member affixed to said first end of said first elongated lateral member, said second end of said elongated cross member affixed to said first end of said second elongated lateral member,
e. a second elongated cross member having a first end and a second end, said second elongated cross member having said length w, said first end of said second elongated cross member affixed to said second end of said first elongated lateral member, said second end of said elongated cross member affixed to said second end of said second elongated lateral member,
f. a third, fourth and fifth elongated cross members, each third, fourth, and fifth elongated cross members having a first end and a second end, each of said third, fourth, and fifth elongated cross members having said length w, wherein the first end of each third, fourth, and fifth elongated cross members is attached to said first elongated lateral member intermediate to said first end of said first elongated lateral member and said second end of said first elongated lateral member, wherein the second end of each third, fourth, and fifth elongated cross members is attached to said second elongated lateral member intermediate to said first end of said second elongated lateral member and said second end of said second elongated lateral member, wherein said third elongated cross member is attached a distant d from said first elongated cross member, said fourth elongate cross member is attached a distant d from said third elongated cross member, said fourth elongated cross member is attached a distant d from said second elongated cross member;

a second traction member apparatus hingeably connected to said first traction device, comprising:

a. a second traction member apparatus first elongated lateral member having a first end and a second end, said first elongated lateral member having said length l, b. a second traction member apparatus second elongated lateral member having first end and a second end, said second traction member apparatus second elongated lateral member having said length l, said second traction member apparatus first elongated lateral member positioned parallel to said second traction member apparatus second elongated lateral member, said first end of said second traction member apparatus first elongated lateral member positioned opposite said first end of said second traction member apparatus second elongated lateral member, said second end of said second traction member apparatus first elongated lateral member positioned opposite said second end of said second traction member apparatus second elongated member, said second traction member apparatus first elongated lateral member being positioned 3d from said second traction member apparatus second elongated lateral member, c. a second traction member apparatus first elongated middle lateral member having a first end and a second end, said second traction member apparatus first elongated middle lateral member having a length l, said second traction member apparatus first elongated middle lateral member positioned parallel to said second traction member apparatus second traction member apparatus second elongated member and said second traction member apparatus first elongated member, said first end of said second traction member apparatus elongated middle lateral member opposite said first end of said second traction member apparatus second elongated lateral member and said first end of said second traction member apparatus first lateral member, said second end of said second traction member apparatus first elongated middle lateral member positioned opposite said second end of said second traction member apparatus first elongated lateral member and said second end of said second traction member apparatus second elongated lateral member, said second traction member apparatus first middle elongated lateral member positioned a distance d from said second traction member apparatus first elongated lateral member, said second traction member apparatus first middle elongated lateral member positioned said distance d from said second traction member apparatus second elongated lateral member, said second traction member apparatus elongated middle lateral member posited a distance d from said second traction member apparatus second elongated lateral member, d. second traction member apparatus second middle elongated lateral member having a first end and a second end, said second traction member apparatus second middle elongated lateral member having a length l, said second traction member apparatus second middle elongated lateral member positioned parallel to said second traction member apparatus first elongated member and said second traction member apparatus first middle elongated member, said first end of said second traction member apparatus second middle elongated lateral member is positioned adjacent said first end of said second traction member apparatus second elongated lateral member and said first end of said first second traction member apparatus first elongated lateral member, said second end of said middle elongated lateral member positioned opposite said second end of said first elongated lateral member and said second end of said second elongated lateral member, said second middle elongated lateral member positioned a distance d from said first elongated lateral member, said second middle elongated lateral member positioned said distance d from said second elongated lateral member, e. a first elongated cross member hingeably connected to said second elongated lateral member having a first end and a second end, said first elongated cross member having a length w, said first end of said first elongated cross member affixed to said first end of said first elongated lateral member, said second end of said elongated cross member affixed to said first end of said second elongated lateral member, f. a second elongated cross member having a first end and a second end, said second elongated cross member having said width w, said first end of said second elongated cross member affixed to said second end of said first elongated lateral member, said second end of said elongated cross member affixed to said second end of said second elongated lateral member, g. a third, fourth and fifth elongated cross members, each third, fourth, and fifth elongated cross members having a first end and a second end, each of said third, fourth, and fifth elongated cross members having said length w, wherein the first end of each third, fourth, and fifth elongated cross members is attached to said first elongated lateral member intermediate to said first end of said first elongated lateral member and said second end of said first elongated lateral member, wherein the second end of each third, fourth, and fifth elongated cross members is attached to said second elongated lateral member intermediate to said first end of said second elongated lateral member and said second end of said second elongated lateral member, wherein said third elongated cross member is attached a distant d from said first elongated cross member, said fourth elongate cross member is attached a distant d from said third elongated cross member, said fourth elongated cross member is attached a distant d from said fourth elongated cross member.

* * * * *